United States Patent [19]

Tanaka et al.

[11] Patent Number: 4,945,544
[45] Date of Patent: Jul. 31, 1990

[54] DIODE LASER PUMPED SOLID-STATE LASER

[75] Inventors: Haruo Tanaka, Shiga; Naotaroh Nakata, Kyoto, both of Japan

[73] Assignee: Rohm Co., Ltd., Kyoto, Japan

[21] Appl. No.: 329,570

[22] Filed: Mar. 28, 1989

[30] Foreign Application Priority Data

Mar. 29, 1988 [JP] Japan .................................. 63-075655

[51] Int. Cl.$^5$ .............................................. H01S 3/091
[52] U.S. Cl. ........................................ 372/70; 372/69
[58] Field of Search ................... 372/69, 70, 75, 66, 372/72

[56] References Cited

U.S. PATENT DOCUMENTS

| 3,663,893 | 5/1972 | Ostermayer, Jr. | 372/75 |
| 3,736,518 | 5/1973 | Anderson et al. | 372/75 |
| 4,764,933 | 8/1988 | Kozlovsky et al. | 372/75 |
| 4,785,459 | 11/1988 | Baer | 372/70 |
| 4,837,771 | 6/1989 | Baer | 372/75 |

Primary Examiner—William L. Sikes
Assistant Examiner—Georgia Y. Epps
Attorney, Agent, or Firm—William H. Eilberg

[57] ABSTRACT

A solid-state laser comprises a columnar laser rod having a central longitudinal axis, a total reflection mirror arranged coaxially of the laser rod in facing relation to one end face thereof, and a half mirror arranged coaxially of the laser rod in facing relation to the other end face thereof. The pumping light is emitted from a plurality of laser diodes arranged in an array laterally spaced from the laser rod in parallel thereto. A cylindrical lens arranged between the laser rod and the array of laser diodes serves to focus the emitted pumping light on the central longitudinal axis of the laser rod. The active substance in the laser rod is excited by the thus focused pumping light to generate a laser beam axially of the laser rod.

5 Claims, 1 Drawing Sheet

DIODE LASER PUMPED SOLID-STATE LASER

BACKGROUND OF THE INVENTION

1. Field of the Invention:

This invention relates generally to lasers, and more particularly to diode laser-pumped solid-state lasers.

2. Description of the Prior Art:

Laser diodes themselves are known as compact and highly efficient devices for generating laser beams. However, due to low energy storage capability, relatively low stability in output light frequency, relatively large light divergence, and so on, the laser diode has found only limited applications.

On the other hand, recent developments in pumping technology have led the attentions of researchers to the possibility of using the laser diode to pump another solid-state laser such as a neodymium-doped yttrium-aluminum-garnet laser (YAG laser) which has been formerly pumped by a linear flash lamp or by an arc lamp. Compared with the conventional pumping sources, the laser diode promises higher energy efficiency, lower heat generation (as required to produce high-quality laser beams) and longer life. The diode laser-pumped solid-state laser provides various potential applications which include coherent radar, global sensing from satellites, medical uses, micro-machining and miniature visible sources for digital optical storage.

For further understanding of the prior art, reference is now made to FIG. 2 of the accompanying drawings which show a typical diode laser-pumped solid-state laser.

As shown in FIG. 2, the prior art solid-state laser comprises a laser diode 101 for emitting divergent pumping light which is collected by a convergent lens 102. The pumping light thus collected enters axially into a laser rod such as a YAG rod 103 in which the active substance (Nd ion) is excited to generate a laser beam by stimulated emission. A part of the produced laser beam passes through a half mirror 104 as an output laser beam, whereas the remaining part is reflected back into the YAG rod for oscillation.

According to the above arrangement, the laser diode 101 is disposed coaxially of the YAG rod 103, so that only one such diode can be used as a pumping light source. Thus, there is a limitation on the achievable laser beam output.

SUMMARY OF THE INVENTION

It is, therefore, an object of the invention to provide a diode laser-pumped solid-state laser which is capable of providing a high output.

Another object of the invention is to provide a diode laser-pumped solid-state laser which is capable of adjusting the laser beam output by simple rearrangement.

A further object of the invention is to provide a diode laser-pumped solid-state laser which is capable of minimizing energy losses.

According to the invention, there is provided a solid-state laser comprising: a laser rod having a central longitudinal axis; a total reflection mirror arranged on the extension of said longitudinal axis in facing relation to one end face of said laser rod; a half mirror arranged on the extension of said longitudinal axis in facing relation to the other end face of said laser rod; a plurality of laser diodes arranged in an array which is spaced laterally from said laser rod in parallel to said longitudinal axis; and a cylindrical lens arranged in parallel to said longitudinal axis between said laser rod and said array of laser diodes, said lens serving to focus the pumping light from said array of laser diodes substantially on said longitudinal axis.

Other objects, features and advantages of the invention will be fully understood from the following detailed description given with reference to the accompanying drawings.

DETAILED DESCRIPTION

Figure 1:
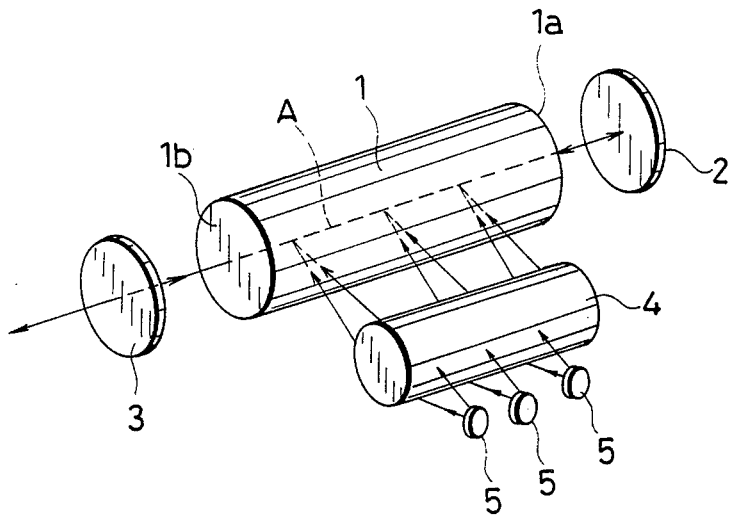
FIG. 1 is a schematic perspective view showing a solid-state laser embodying the invention.
Figure 2:
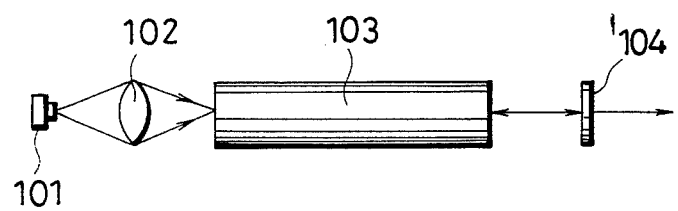
FIG. 2 is a schematic side view showing a typical prior art solid-state laser.

Referring now to FIG. 1 of the accompanying drawings, a solid-state laser embodying the invention comprises a columnar laser rod 1 having a central longitudinal axis A. A total reflection mirror 2 is arranged on the extension of the axis A in facing relation to one end face 1a of the laser rod. A half mirror 3 is also arranged on the extension of the axis A but in facing relation to the other end face 1b of the laser rod. The laser rod may be made of any suitable laser rod material such as neodymium-doped yttrium-aluminum-garnet (Nd:YAG), neodymium glass (Nd:glass) and neodymium-doped lithium yttrium fluoride (Nd:YLF).

A cylindrical lens 4 is disposed laterally of the laser rod 1 in parallel thereto. Arranged further laterally of the cylindrical lens 4 are a plurality of laser diodes 5 in an array parallel to the axis A of the laser rod. Each laser diode is employed as a pumping light source, and may comprise a GaAlAs laser diode.

The position of the cylindrical lens 4 is selected so that the pumping light emitted by the array of laser diodes 5 is focused exactly on the axis A of the laser rod 1. The pumping light thus introduced is absorbed to excite the active substance, Nd ion for example, of the laser rod. The active substance thus excited undergoes energy transition or emission to generate laser beams axially of the laser rod.

The laser beam penetrating through the one end face 1a of the laser rod 1 is completely reflected by the total reflection mirror 2 to re-enter the laser rod. On the other hand, a part (about 10% for example) of the laser beam penetrating through the other end face 1b of the rod is allowed to pass through the half mirror 3 as an output laser beam, whereas the remaining part is reflected by the half mirror to re-enter the laser rod. In this way, the laser beam is oscillated, while a portion thereof is taken out as an output.

Each laser diode 5 is capable of generating pumping light whose wave length corresponds to the strongest absorption band (about 800 nm for Nd ion) of the laser rod. Thus, it is possible to obtain a high pumping efficiency. Further, the use of the cylindrical lens 4 for focusing the pumping light on the laser rod axis A minimizes beam generation in transverse mode, consequently reducing energy loss. Compared with utilizing a plurality of normal convex lenses for focusing light beams in point form, the use of the single cylindrical lens 4 is moreover advantageous in the simplicity of arrangement and in the capability of focusing the pumping light in line form along the laser rod axis A (as required for efficient absorption of the pumping light).

According to the invention, the array of laser diodes 5 as pumping light sources enables supply of a high pumping energy to thereby produce a high power laser beam for various applications. Further, the laser output may be varied by changing the number of laser diodes to be incorporated into the array.

The invention being thus described, it is obvious that the same may be varied in many ways. Such variations are not to be regarded as a departure from the spirit and scope of the invention, and all such modifications as would be obvious to those skilled in the art are intended to be included within the scope of the following claims.

We claim:

1. A solid-state laser comprising:
   a laser rod having a central longitudinal axis;
   a total reflection mirror arranged on the extension of said longitudinal axis in facing relation to one end face of said laser rod;
   a half mirror arranged on the extension of said longitudinal axis in facing relation to the other end face of said laser rod;
   a plurality of laser diodes arranged in an array which is spaced laterally from said laser rod in parallel to said longitudinal axis, said array of laser diodes emitting pumping light toward said laser rod; and
   a cylindrical lens arranged in parallel to said longitudinal axis between said laser rod and said array of laser diodes, said lens serving to focus said pumping light from said array of laser diodes substantially on said longitudinal axis to generate efficiently a laser beam along said longitudinal axis within said laser rod.

2. The solid-state laser as defined in claim 1, wherein said laser rod is made of neodymium-doped yttrium-aluminum-garnet.

3. The solid-state laser as defined in claim 1, wherein said laser rod is made of neodymium glass.

4. The solid-state laser as defined in claim 1, wherein said laser rod is made of neodymium-doped lithium yttrium fluoride.

5. The solid-state laser as defined in claim 1, wherein said laser rod is columnar.

* * * * *